NON-SYNCHRONOUS SCANNING CIRCUIT

Filed Dec. 4, 1961

INVENTORS
HANNON S. YOURKE
SAMMY A. BUTLER
BY [signature]
ATTORNEY

United States Patent Office 3,104,332
Patented Sept. 17, 1963

3,104,332
NON-SYNCHRONOUS SCANNING CIRCUIT
Hannon S. Yourke, Peekskill, N.Y., and Sammy A. Butler, Champaign, Ill., assignors to International Business Machines Corporation, New York, N.Y., a corporation of New York
Filed Dec. 4, 1961, Ser. No. 156,593
5 Claims. (Cl. 307—88.5)

This invention relates to scanning circuits and more particularly to a low-cost non-synchronous scanning circuit employing tunnel diodes.

Scanning circuits are known which utilize a plurality of transistor latch circuits connected in ring cascade and so arranged that only one latch will be in the ON state at any one time with means provided for stepping the ON state of a latch circuit around the ring. Another type of scanning circuit is a binary-counter with diode gating and a logic arrangement whereby only one gate is enabled for each state of the counter. For purposes of line switching, where N lines seek access to one line and one of the N lines at a time is assigned the connection to the one line for an arbitrary duration of time, as opposed to time division multiplexing, where each N line is assigned a connection to the one line for a specific period of time in sequence, the above techniques have been found to be expensive in a pecuniary sense.

By constructing a scanning circuit according to this invention which employs line switching techniques, the high cost heretofore encountered is substantially removed. More specifically, a scanning circuit according to this invention is provided by connecting a plurality of stages in cascade. Each stage is provided with a semiconductor switching element operative in a non-conductive OFF state and a saturation conductor ON state and a tunnel diode biased for bistable operation connected to the switching element so that the diode is switched from a datum to a further stable state when the switching element is turned ON. Access means are connected to the tunnel diode of a stage for inhibiting the diode from switching to the further stable state when energized and input means are connected to the switching element of a stage for transmitting information pulses through the switching element and the diode when the access means inhibits said diode. Further means are provided connecting the tunnel diode of each said stage to the switching element of the next succeeding stage so that the switching element of each stage is turned ON when the tunnel diode of the next preceding stage is switched to the further stable state, and means are provided for resetting the diode of each stage to the datum stable state.

Accordingly, it is a prime object of this invention to provide an improved scanning circuit.

Another object of this invention is to provide an improved low-cost scanning circuit capable of operating at high speeds and yet relatively cheap to construct.

Still another object of this invention is to provide a non-synchronous scanning circuit employing tunnel diodes.

The foregoing and other objects, features and advantages of the invention will be apparent from the following more particular description of a preferred embodiment of the invention, as illustrated in the accompanying drawings.

Figures 1, 2:
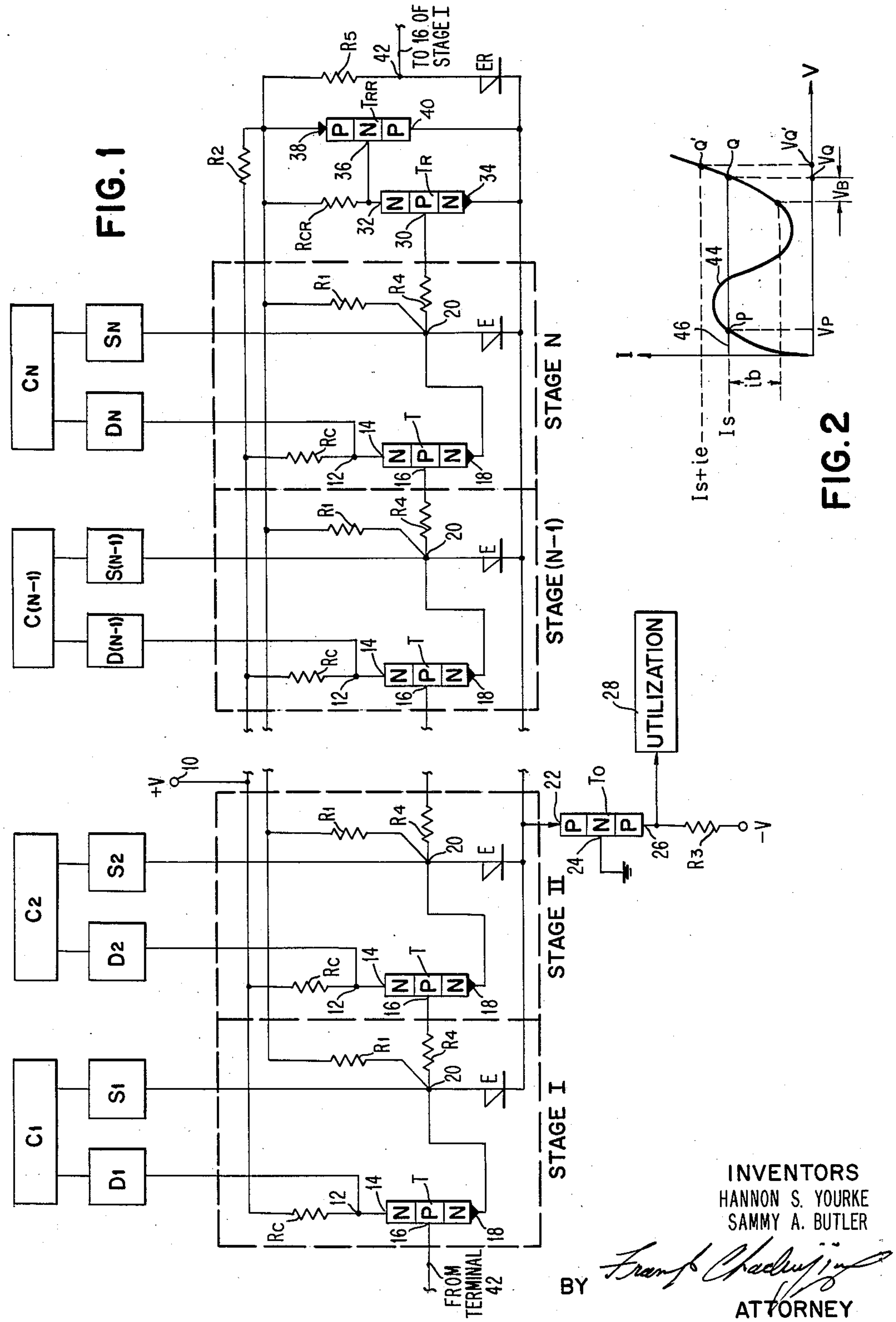
FIG. 1 is a schematic of a scanning circuit according to this invention.
FIG. 2 illustrates a characteristic of a tunnel diode and its operation in the circuit of FIG. 1.

Referring to the FIG. 1, a scanning circuit according to this invention is shown having a plurality of cascaded stages I, II, . . . (N–1), N. Each stage of the scanning circuit is energized by a +V voltage supply at a terminal 10. The +V supply is connected to a resistor R*c* of each stage, a terminal 12 and a collector electrode 14 of an NPN transistor T. The transistor T of each stage has a base electrode 16 and an emitter electrode 18. The emitter electrode 18 of transistor T in each stage is connected to a terminal 20. The terminal 20 has one connection through a resistor R1 and a resistor R2 back to the terminal 10 and the +V supply. The terminal 20 has another connection to one side of a tunnel diode E. The other side of diode E of each stage is connected to an emitter electrode 22 of a PNP transistor T*o* having base and collector electrodes 24 and 26, respectively. The base 24 of T*o* is grounded, while the collector 26 is connected to a utilization means 28 and a voltage source —V through a resistor R3. The terminal 20 of each stage is also connected to the base electrode 16 of transistor T of the next succeeding stage through a resistor R4.

The last stage N of he circuit is connected to a level setting or reset start circuit which functions to reset and condition all stages of the circuit. The terminal 20 of stage N is connected to a base electrode 30 of an NPN transistor TR through resistor R4. The transistor TR has a collector electrode 32 and an emitter electrode 34. The collector electrode 32 of TR is connected to the power supply +V through a resistor R*cr* and R2, and is also connected to a base electrode 36 of a PNP transistor TRR having an emitter electrode 38 and a collector electrode 40. The emitter electrode 38 of TRR is connected to resistor R2 and to a terminal 42 through a resistor R5. The terminal 42 is connected to one side of a tunnel diode ER. The other side of tunnel diode ER, the collector terminal 40 of TRR and the emitter electrode 34 of TR are each commoned to the emitter electrode 22 of PNP transistor T*o*. The terminal 42 of the reset start circuit is connected to the base electrode 16 of transistor T of stage I.

As is the function of a scanning circuit, information from different data centers C1, C2, . . . C*n*–1, C*n*, is allowed to pass to a central utilization center 28. It is therefore the function of the scanning circuit of FIG. 1 to sequentially interrogate each of the data centers C1 through C*n* to see if any one is in a position to transfer data to the central utilization means 28. Each of the data centers C1 through C*n*, has an information data output line D1, D2, . . . D*n*–1, D*n*, respectively, and a ready signal line S1, S2, . . . S*n*–1, S*n*, respectively. When a data center C is in a position to send data to the utilization means 28 of a central station, the ready signal line S transmits a negative bias to the terminal 20 of a particular stage of the scanner and this signal is likened to the "off hook" signal of a telephone exchange system. The scanning circuit is sequentially scanning each of the stages and hence the signal lines S1 through S*n*, gives access to the data line D1 through D*n* requiring access to the central utilization means 28.

Before describing the operation of the circuit of FIG. 1, in order to clarify operation of the various tunnel diodes E in this circuit, reference is now made to the FIG. 2 which is a plot of current (I) versus potential (V) for a tunnel diode E in the circuit of FIG. 1 exhibiting an output characteristic as is shown by a curve 44. The curve 44 in the FIG. 2, describes a first region of positive resistance over a low range of potentials and adjoining at a peak current value, a second region of negative resistance and thence a third region of positive resistance. The curve 44 may be described as an "*n*" type characteristic being short circuit stable and open circuit bistable. The combination of the +V supply applied to terminal 10 and the resistor R1 biases each of the diodes E with a constant current source I*s* while the load presented to each of the diodes E is defined by a load line 46 intersecting the characteristic 44 at a point P in the first positive resistance region of the diode, at a voltage $V_p$ and at a point Q, at a voltage $V_q$ in the third region of the characteristic 44. It should be noted that the circuit is so constructed that the load line 46 intersects the characteristic 44 of diode E at the point P which is near the peak current magnitude before the negative resistance region of the diode E. Although the load line 46 is slightly dipped, each of the diodes E may be considered as having a substantially open circuit load connected thereto.

Referring now to both FIGS. 1 and 2, assume that all the diodes E of each stage I, II, . . . N–1, N, are in the low voltage stable state P, except the diode ER which is in the high voltage stable state Q and each of the ready signal lines S1 through S*n* are not requesting access to utilization means 28. With the diode ER in the Q stable state, a positive voltage is provided to the base 16 of transistor T of stage I switching the transistor T from a nonconductive state towards saturation. The conducting transistor T of stage I provides more current from the emitter 18 to the terminal 20 of stage I. Emitter current, i.e., from the transistor T in combination with the current already provided to the diode E, $I_s$, switches the tunnel diode E of stage I from the P stable state to a second transitory state Q′. The diode E of stage I in switching to the Q′ state undergoes a voltage change to a voltage $V_q'$ since the voltage $V_q'$ across the diode E of stage I is greater than the voltage $V_q$ across the diode ER, the transistor T of stage I is cut off and the diode E of stage I assumes the Q stable state at voltage $V_q$. The positive voltage change across the diode E of stage I, ($V_q$—$V_t$) provides a positive voltage bias to the base 16 of transistor T of stage II. The transistor T of stage II is then switched towards saturation and provides a current from the emitter, i.e., to the terminal 20 and tunnel diode E of stage II. The tunnel diode E of stage II is then switched to the Q′ stable state to cut off the transistor T of that stage and be established in the Q stable state at voltage $V_q$. This progression is then duplicated for the remaining stages of the circuit until the tunnel diode E of stage N is established in the Q stable state. The tunnel diode E of stage N being established in the Q stable state provides a positive voltage change to the base 30 of transistor TR, switching the transistor TR toward saturation. As the transistor TR is switched towards saturation a negative voltage change is applied to the base 36 of transistor TRR switching the transistor TRR towards saturation. As the transistors TR and TRR go into saturation, the current flowing through both TR and TRR also flows through resistor R2. The additional current flowing through R2 provides a greater voltage drop across R2 which resets each of the tunnel diodes E of stages I through N and the tunnel diode ER to the P stable state. As the tunnel diode E of stage N is switched from the Q stable state back to the P stable state, the transistor TR is cut off, which in turn cuts off the transistor TRR. As the transistor TR and transistor TRR come out of saturation, the current through resistor R2 decreases and the voltage across R2 decreases. The decreasing voltage drop across R2 allows the diode ER to switch from the P stable state to the Q stable state since the resistor R5 has a smaller value than any one of the resistors R1. The diode ER in switching from the P to the Q stable state then starts the sequential scanning cycle over again.

During the sequential scanning of each of the stages I—N assume the station C2 requests access to send information to the central utilization means 28. The ready signal line S2 is energized to provide a negative polarity bias to the terminal 20 of stage II. Since the stage II of the scanner may have been scanned already, in that the diode E of stage II is already in the Q stable state, the negative bias from the ready signal line S2 is controlled so that the negative voltage used as a stop is not large enough to provide a current which resets the diode E of that stage from its high voltage state Q to its low voltage state P. On the other hand, the currents provided by the saturation of transistor T of a particular stage must be large enough to switch the tunnel diode E of that stage from the P to the Q stable state, but must not be so large as to switch the diode E of that stage when the ready signal voltage from the S line of that stage is energized for stop operation. Thus, referring to the FIG. 2, a ready signal stop line S is energized by its associated C center to provide a negative current bias of *ib*. Assume that the ready signal line S2 is energized to provide a negative bias —*ib* to the terminal 20 of stage II, and that the tunnel diode E of stage II is operating in the C stable state. When the transistor T of stage II is switched into saturation, a low impedance path then exists from the terminal 12 through the transistor T, terminal 20, tunnel diode E to the —V supply through transistor T*o*.

Although the circuit of FIG. 1 is shown using a tunnel diode ER in combination with a resistor R5 to provide initiating voltage bias to the first stage I, it should be realized that the diode ER and resistor R5 are employed as a voltage bias, therefore, any voltage bias, such as a battery, may be employed to establish a D.C. level. Further, it should be apparent that the modulating signals from D1–DN must be sufficiently small so as not to alter the requirements set forth above. This is necessary, since, when a transistor T of any one stage is saturated, the emitter current which flows through the associated tunnel diode is the sum of the current through resistor R*c* and the source D. Still further, it should also be noted that any low input impedance eamplifier may be substituted for the output transistor T*o* shown in the FIG. 1.

In order to aid in understanding and practicing the invention and to provide a starting point for one skilled in the art in the fabrication of the circuits of the invention, the following set of specifications for an embodiment of this invention is provided below. It should be understood, however, that no limitation should be construed since other component values may be employed with satisfactory operation.

In the circuit of FIG. 1, each of the PNP transistors T and TR may be germanium alloy transistors having an $\alpha$ cut-off in the range of 2 megacycles, a collector breakdown of 30 volts, an emitter-base potential drop of 0.3 volts when forward biased to one milliampere with a $\beta$, the collector to base current gain, of at least twenty and a power dissipation of thirty milliwatts. The PNP transistors T*o* and TRR may have characteristics similar to the NPN transistors T and TR. The tunnel diodes E and ER may be germanium diodes having a five milliampere peak current value, a peak to valley current ratio of 10:1, with the voltage $V_q$ at the stable state Q being greater than 0.3 volts. The resistors R*c* may have a value of 9K ohms; the resistors R1 a value of 1.5K ohms; the resistor R2 a value of 560 ohms; the resistor R3 a value of 350 ohms; the resistors R4 and R5 a value of 1K ohms; the resistor R*cr* a value of 510 ohms; while the voltage source may provide a bias of 17 volts and the magnitude of the negative current impulse from any one S line may be 2 milliamperes with the signal from any one data input line D having a peak current magnitude of 0.1 milliamperes.

While the invention has been particularly shown and described with reference to a preferred embodiment thereof, it will be understood by those skilled in the art that other changes in form and details may be made therein without departing from the spirit and scope of the invention.

What is claimed is:

1. In combination with a plurality of data sets each having a ready stop output line for signifying desirability of access to a central utilization means and having an information data output line for transmitting information to said central utilization means when access is granted; a scanning circuit connected intermediate said data sets and said central utilization means comprising; a plurality of stages connected in cascade, one stage being associated with one data set, for sequentially scanning said data sets to connect a data output line of a data set to the central utilization means when the ready stop output line thereof signifies desirability of access and said scanning circuit is in a condition to grant access, where each said stage comprises; an NPN transistor operable in a non-conductive OFF state and a saturation conductive ON state; a tunnel diode biased for bistable operation connected to said NPN transistor so that said diode is switched from a low voltage datum stable state to a high voltage further stable state, when said transistor is turned ON; means coupling the tunnel diode of each stage to the NPN transistor of the next succeeding stage so that the transistor of the next succeeding stage is turned ON when the tunnel diode of the next preceding stage is switched to said further stable state; further means operable when all the diodes of all said stages are in said further stable state for resetting said diodes to said datum stable state; and means connecting the data output lines and the ready stop output lines of each data set to the transistor and the tunnel diode, respectively, of each associated stage of said scanning circuit, said ready stop output line operative to prevent the tunnel diode from switching to said further stable state until access is no longer required to the central utilization means when the switching NPN transistor of the associated stage is turned ON whereby a data set is granted access to said central utilization means.

2. In combination with a plurality of data sets each having a ready stop output line for signifying desirability of access to a central utilization means and having an information data output line for transmitting information to said central utilization means when access is granted; a scanning circuit connected intermediate said data sets and said central utilization means comprising; a plurality of stages connected in cascade, one stage being associated with one data set, for sequentially scanning said data sets to connect a data output line of a data set to the central utilization means when the ready stop output line thereof signifies desirability of access and said scanning circuit is in a condition to grant access, where each said stage comprises; a semiconductor switching element operable in a non-conductive OFF state and a conductive ON state; a tunnel diode biased for bistable operation connected to said switching element so that said diode is switched from a datum stable state to a further stable state, when said switching element is turned ON; means coupling the tunnel diode of each stage to the switching element of the next succeeding stage so that the switching element of the next succeeding stage is turned ON, when the tunnel diode of the preceding stage is switched to said further stable state; further means for resetting the diode of each said stage; and means connecting the data output lines and the ready stop output lines of each data set to the switching element and the tunnel diode, respectively, of each associated stage of said scanning circuit, said ready stop output line operative to prevent the tunnel diode from switching to said further stable state until access is no longer required to the central utilization means when the switching element of the associated stage is turned ON whereby a data set is granted access to said central utilization means.

3. A circuit comprising a plurality of cascaded stages, each said stage comprising; a semiconductor switching element operable in a non-conductive OFF state and a saturation conductive ON state, a tunnel diode biased for bistable operation connected to said switching element so that the diode is switched from a datum to a further stable state when said switching element is turned ON, access means connected to the tunnel diode for inhibiting the diode from switching to said further stable state when energized, input means connected to said switching element for transmitting information pulses through said switching element and said diode when said access means inhibits said diode, means connecting the tunnel diode of each stage to the switching element of the next succeeding stage so that the switching element of each stage is turned ON when the tunnel diode of the next preceding stage is switched to said further stable state, and means for resetting the diode of each stage to the datum stable state.

4. A circuit comprising a plurality of cascaded stages, each said stage comprising; a transistor operable in a non-conductive OFF state and a saturation conductive ON state, a tunnel diode biased for bistable operation connected to said transistor so that the diode is switched from a low voltage datum to a high voltage further stable state when said transistor is turned ON, access means connected to the tunnel diode for inhibiting the diode from switching to said further stable state when energized, input means connected to said transistor for transmitting information pulses through said transistor and said diode when said access means inhibits said diode, means connecting the tunnel diode of each stage to the transistor of the next succeeding stage so that the transistor of each stage is turned ON when the tunnel diode of the next preceding stage is switched to said further stable state, and means for resetting the tunnel diode of each stage to the datum stable state only when the tunnel diode of each stage is in the further stable state.

5. A circuit comprising a plurality of stages connected in a ring cascade circuit, each said stage comprising; an NPN transistor having a base electrode, a collector electrode and an emitter electrode; said transistor operable in a non-conductive OFF state and a saturation conductive ON state; a tunnel diode biased for bistable operation connected to the emitter electrode of said transistor so that said diode is switched from a low voltage datum to a high voltage further stable state when said transistor is turned ON, access means connected to the tunnel diode for inhibiting the diode from switching to said further stable state when energized, input means connected to the collector electrode of said transistor for transmitting information pulses through said transistor and said diode when said access means inhibits said diode, means connecting the tunnel diode of each stage to the base electrode of the transistor of the next succeeding stage so that the transistor of each stage is turned ON when the tunnel diode of the next preceding stage is switched to said further stable state, and means for resetting the tunnel diode of each stage to the datum stable state only when the diode of all stages is in the further stable state.

References Cited in the file of this patent

UNITED STATES PATENTS 2,863,049 Lee et al. _______________ Dec. 2, 1958